Dec. 25, 1962 — O. D. SHERNING — 3,069,752
METHOD OF MAKING A HIGH TEMPERATURE THERMOCOUPLE
Filed Feb. 6, 1959
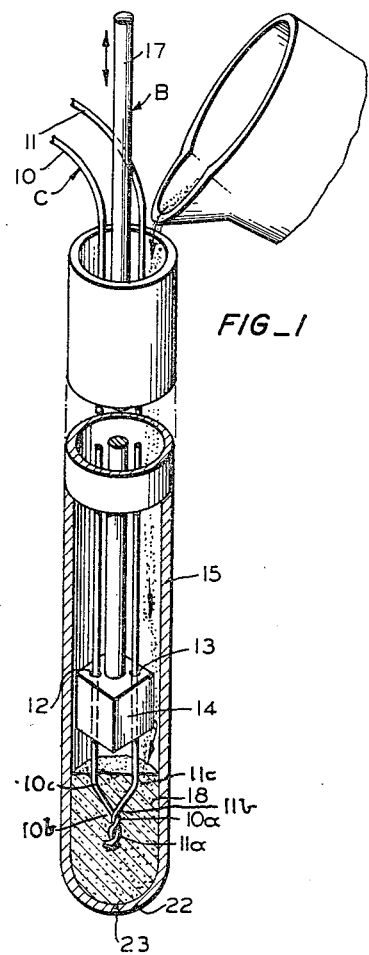
FIG_1
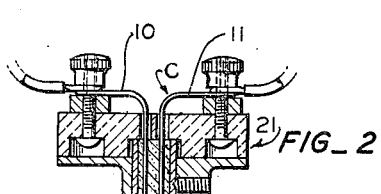
FIG_2
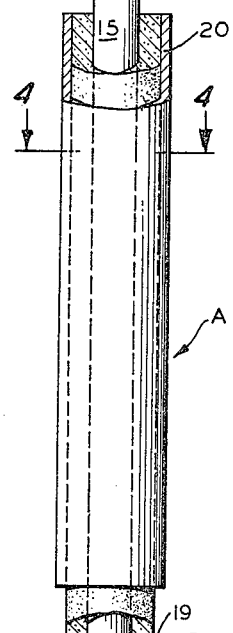
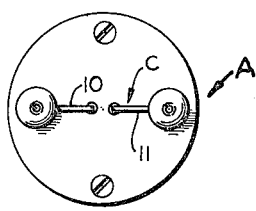
FIG_3
FIG_4
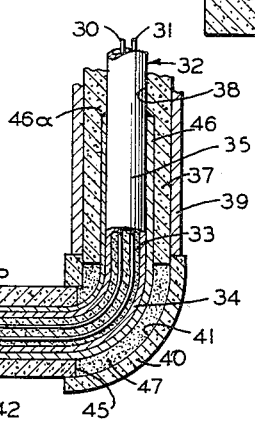
FIG_5
INVENTOR
OLUF D. SHERNING
BY Hansen and Lane
ATTORNEYS _3,069,752_
METHOD OF MAKING A HIGH TEMPERATURE
THERMOCOUPLE
Oluf D. Sherning, San Jose, Calif., assignor of one-half to George H. Roach, Sunnyvale, Calif.
Filed Feb. 6, 1959, Ser. No. 791,556
2 Claims. (Cl. 29—155.5)

The present invention relates to a thermocouple, and pertains more particularly to an improved, high temperature thermocouple.

In the making of high temperature thermocouples, the thermocouple wires ordinarily are mounted in a protective housing, and it is important that these wires be electrically insulated from each other and from the housing during the useful life of the thermocouple. Also, it sometimes is desirable to be able to use a thermocouple with only shallow immersion thereof in a heat treating bath, such as, for example, carburizing baths and baths of various salts, including cyanide. This shallow immersion feature is desirable when the bath itself is shallow, or to avoid electrical or magnetic currents which may exist in the lower part of a bath.

The present invention provides an improved thermocouple which is well adapted to resist the corrosive action of various atmospheric conditions and baths, which, in the past, have caused rapid deterioration of thermocouples used therein, and also in one modification of the invention, to provide a thermocouple for shallow immersion in baths of heated material.

The invention also provides a thermocouple wherein the thermocouple wires are accurately positioned relative to each other and to a housing in which they are mounted, and are packed in pulverulent insulative material to anchor the wires against displacement.

The invention also provides for uniform and controlled packing of inert pulverulent material around the wires of a thermocouple to protect them from contamination by corrosive gases which may be present in the ambient atmosphere, since such contamination, when it occurs, results in thermal drift of the temperature reading.

A further object of the invention is to provide an improved thermocouple for use in high temperature work.

A further object of the invention is to provide an improved guiding and packing tool for mounting the wires of a thermocouple in a protective housing.

A still further obect of the invention is to provide a new method for mounting a pair of thermocouple wires in a housing.

These, and other objects and advantages of the invention, will be apparent from the following description and the accompanying drawings, wherein:

FIG. 1 is a perspective view showing a pair of thermocouple wires in the act of being mounted in a housing in accordance with the invention, portions being broken away.

FIG. 2 is a view, partly in side elevation and partly in medial section, showing the housing assembly of FIG. 1 as it appears when provided with an outer protective sheath and casing, and a terminal head.

FIG. 3 is a plan view of the structure shown in FIG. 2.

FIG. 4 is an enlarged, sectional view taken along line 4—4 of FIG. 2.

FIG. 5 is a fragmentary, longitudinal, medial, sectional view through the lower portion of a modified form of thermocouple embodying the invention.

Briefly, a thermocouple A embodying the invention (FIGS. 2 and 4) comprises a usual pair of thermocouple wires 10 and 11. In making the thermocouple, these wires are threaded through holes 12 and 13, respectively, in the tamping head 14 of a special tool B for mounting the thermocouple wires in a protective, tubular housing 15. A handle rod 17, preferably of a length greater than the housing tube 15, is secured co-axially to the tamping head 14.

Powdered, heat resistant, electrical insulative material 18, such as, for example, powdered alumina, is poured into the housing tube 15 while the tool B is being reciprocated up and down in tamping strokes within the housing tube. This reciprocative movement of the tool B assists in causing the material 18 to flow around the tamping head 14 of the tool B, and tamps said material into the housing tube. At the same time, the tool B guides the thermocouple wires 10 and 11, holding them accurately in properly spaced relation to each other and to the housing tube.

When the housing tube 15 is filled with the powder 18, as shown in FIG. 2, the tool B will have worked its way entirely out of the top of the housing tube, leaving the thermocouple wires embedded in a packed filling of the insulative material. The housing tube 15 preferably is inserted in a recess 19 provided axially of a graphite protective sheath 24, which, in turn, is fitted into a metal casing 20. A usual terminal block 21 is mounted on top of the housing tube 15 to complete the thermocouple A.

Referring to the drawings in detail, the housing tube 15 may be of suitable material, for example, quarter inch iron pipe. The lower end portion 22 of the tube 15 is sealed off or closed in any suitable manner, for example, by the well known hot spinning process with a welded spot 23 sealing the final aperture after such spinning.

The thermocouple wires 10 and 11 may be of suitable material in accordance with common practice, such as, for example, Alumel 10 and Chromel 11, and may be of suitable gauge or diameter, for example 16 gauge. The ends 10a and 11a of the thermocouple wires 10 and 11, respectively, are intimately interconnected in accordance with well known thermocouple practice, for example, by intertwisting them as illustrated in FIGS. 1, 2 and 5 and preferably additionally partially fusing or welding them together.

Just above their intimately joined end portions 10a and 11a the thermocouple wires 10 and 11 are bent divergently outwardly at 10b and 11b, and then are bent again at 10c and 11c to lie substantially parallel with each other. The free ends of the thermocouple wires then are introduced through the holes 12 and 13 in the tamping head portion 14 of the tool B, and an initial quantity of the insulative powder 18 in which the thermocouple is to be buried is poured into the bottom of the housing tube 15. The tamping head 14 has side portions thereof in guiding relation with the interior of the tube 15, and other portions thereof spaced inwardly from the tube 15 so as to allow the insulating powder 18 to flow therebetween. In the illustrated tool B this is accomplished by making the head 14 of square cross sectional shape, with a diagonal of the square slightly less than the internal diameter of the housing tube 15.

The thermocouple wires 10 and 11 fully inserted into the holes 12 and 13 in the tool head 14, are then introduced into the housing tube 15 to a desired depth to bring the interconnected lower ends of the wires 10 and 11 a desired distance from the closed lower end 22 of the housing tube 15. Additional insulative powder 18 is then poured into the housing 15, and at the same time the tool B is moved reciprocally within the tube 15 to tamp the powder 18 into the tube 15, and to guide the thermocouple wires 10 and 11, threaded through the head 14, into accurately centered and spaced apart condition within the tube 15. The tamping head 14 is forced to rise in the housing tube 15 by the increasing depth of the powder 18 therebeneath. The degree, or hardness, of the tamping may be regulated by controlled manipulation of the tool B.

This pouring and tamping process is continued until the tamping tool B has worked its way upwardly completely out of the housing tube 15, leaving the latter filled with the tamped powder, in which the thermocouple wires 10 and 11 are embedded in accurately located condition, as shown in FIGS. 2 and 5.

For protecting the housing tube 15, a graphite sheath 24 is provided. Such sheath may be made from a length of graphite rod, with the recess 19 drilled axially therein of a size to receive the housing tube 15 closely therein. Before inserting the housing tube 15 into the axial recess 19, the tube 15 preferably is coated with a carbonaceous or key graphite paste 27 (FIG. 4), which fills any voids which might otherwise exist between the housing tube 15 and the graphite sheath 24.

The outer protective casing 20 is fitted on exteriorly of the graphite sheath 24. This casing 20 preferably is of suitable metal, such as, for example, wrought iron, steel, stainless steel or Inconel, the metal used depending, in part at least, upon the chemical activity of the bath or atmosphere in which the thermocouple may be used. The casing 20 needs only to extend slightly below the line to which the thermocouple is to be immersed in a heating bath, since, as is well known, the zone at the surface of such bath is that in which the most destructive corrosive effects exist. Before fitting the graphite sheath 24 into the casing 20, the former also may be coated with a suitable graphite paste 27'.

After the thermocouple A is completely assembled as shown in FIG. 2, it is slowly heated to a temperature which will dry out the paste used in assembling the parts as described previously herein. This heating must be gradual enough so as not to form steam under pressure from the evaporation of the liquid element of the paste employed for seating the various parts, since such pressurized steam might have damaging effects.

In the modified form C of the invention shown in FIG. 5, thermocouple wires 30 and 31 similar to the wires 10 and 11 of FIGS. 1–4, are mounted in an initially straight, metal housing tube 32 before the latter is bent, in which condition the tube 32 would be similar to the tube 15 (FIGS. 1–4). The thermocouple wires 30 and 31 are mounted in the tube 32 while the latter is in its initially straight condition, and are embedded in tamped insulative powder 33 therein in the same manner as that shown in FIG. 1 and described previously herein.

The tube 32, with the thermocouple wires 30 and 31 embedded in the powder 33 therein, is then bent at right angles at 34 by means of a conventional pipe or tube bender. Since such bending has a tendency to stretch the outer portion of the tube at such bend, a reinforcing sleeve 46 of tubing material similar to the housing tube 32, but of a size to receive the housing tube closely therein, is fitted over the bending zone of the housing tube before bending the latter. The reinforcing tube 46 preferably is welded to the housing tube 32 as at 46a and 46b. The reinforcement 46 is thus bent simultaneously with the housing to provide the reinforced structure 32, 46 shown in FIG. 5.

The tubes 32 and 46 preferably are bent at right angles to a plane defined by the axes of the thermocouple wires 30 and 31 before bending, so as to avoid any tendency to stretch or displace either of the wires. The upper portion 35 of the housing tube above the bend 34 therein is inserted into a graphite sheath 37. The latter may be made by drilling an axial hole 38 entirely through a length of graphite rod similar to that used in the making of the graphite sheath 19 of FIGS. 2 and 4.

A protective metal casing 39 is also provided over the graphite sheath 37. The housing tube 32 preferably is coated with a suitable graphite paste before mounting the graphite sheath 37 thereon. The sheath 37 in turn is also preferably coated with such paste before mounting the casing 39 thereon.

A ninety degree elbow 40 of graphite has an opening 41 therethrough of a size to permit the elbow 40 to be fitted over the right angle bend 34 in the housing tube 32, 46, and is mounted thereon as shown in FIG. 5. One outlet of the opening through the elbow 40 is fitted onto the lower end of the upper graphite sheath 37.

A second graphite sheath 42, made by drilling a recess 43 axially in a graphite rod, similarly to the sheath 19 of FIG. 2, is mounted over the lower end portion 44 of the housing tube 32 below the bend 34 therein. The open end portion 45 of the lower graphite sheath 42 is fitted into the other outlet of the opening through the graphite elbow 40 from the upper sheath 37. The space between the elbow 40 and the reinforcing tube 46 preferably is filled with a suitable graphite paste 47 before assembling the lower sheath member 42 therewith.

After assembly, the angle thermocouple C as shown in FIG. 5 is baked at a gradually increasing temperature to evaporate and drive out the liquid content of the paste used for assembling the parts in the same manner as that described for the straight thermocouple A previously herein. After mounting a conventional terminal block, such as the terminal block 21 of FIGS. 2 and 3, on the upper end of the thermocouple C the latter is ready for use.

The invention provides a rugged, long lived thermocouple, and one which is capable of use either in deep or shallow immersed condition as required. The mounting of the thermocouple wires is much simpler and more exact than in other currently practiced methods of thermocouple manufacture.

While I have illustrated and described a preferred embodiment of the present invention, and one modified form thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. The method of mounting a pair of thermocouple wires in a tubular housing having the upper end thereof open and the lower end thereof closed which comprises intimately interconnecting the lower end portions of a pair of substantially straight thermocouple wires, bending the wires adjacent their interconnected lower end portions so that the remainder of the wires are substantially straight, parallel, and spaced apart by a distance less than the internal diameter of such housing, fitting the upper ends of said wires for relative slidable movement into a pair of wire guide holes provided therefor in a tamping tool and spaced apart by approximately the same distance as the parallel portions of said wires, such tamping tool being of a size to fit slidably within the housing, inserting the tamping tool with the wires inserted in the holes therein and with the interconnected lower end portions of the wires positioned closely adjacent the under side of the tamping tool into the housing a distance sufficient to position the interconnected lower ends of the wires in precisely upwardly spaced relation to the closed lower end of the housing, slowly pouring a quantity of substantially inert, high temperature resistant powder into the housing while retaining the wires against longitudinal movement relative to the housing, and simultaneously moving the tamping tool up and down in short tamping strokes, a side portion of the tamping tool being spaced inwardly from the housing to provide therebetween a passage for such powder into the portion of the housing below the tamping tool, the movement of the tamping tool acting to compact the powder within the housing below the tamping tool, and continuing such simultaneous pouring of the powder and moving of the tamping tool until the housing is sufficiently filled with the powder, whereby the thermocouple wires will be embedded in the tamped powder, and the straight, parallel portions thereof will be in uniformly spaced, parallel relation to each other and to the enclosing tubular housing.

2. A method according to claim 1 wherein the tube, with the wires embedded therein, is then bent transversely of a plane defined by the straight parallel portions of the wires.

References Cited in the file of this patent

UNITED STATES PATENTS

| | | |
|---|---|---|
| 1,359,400 | Lightfoot | Nov. 16, 1920 |
| 2,703,335 | Andrus | Mar. 1, 1955 |
| 2,768,424 | Andrus | Oct. 30, 1956 |
| 2,844,637 | Borel et al. | July 22, 1958 |
| 2,853,765 | Wemhoener | Sept. 30, 1958 |

FOREIGN PATENTS

| | | |
|---|---|---|
| 1,131,200 | France | Oct. 15, 1956 |
| 1,032 | Great Britain | Jan. 15, 1903 |